United States Patent [19]

Wen et al.

[11] 3,866,061

[45] Feb. 11, 1975

[54] OVERLAP TIMING CONTROL CIRCUIT FOR CONDITIONING SIGNALS IN A SEMICONDUCTOR MEMORY

[75] Inventors: Samuel S. Wen, Teaneck; Donald J. Nelson, Sayreville, both of N.J.

[73] Assignee: Burroughs Corporation, Detroit, Mich.

[22] Filed: Aug. 27, 1973

[21] Appl. No.: 391,963

[52] U.S. Cl. .................... 307/208, 307/293, 328/55, 328/63

[51] Int. Cl. ......................... H03k 19/08, H03k 1/00

[58] Field of Search ........ 307/293, 208; 328/55, 56, 328/63, 62

[56] References Cited

UNITED STATES PATENTS

| | | | |
|---|---|---|---|
| 3,028,552 | 4/1962 | Hahs | 328/55 |
| 3,162,815 | 12/1964 | Morgensen | 328/55 |
| 3,238,461 | 3/1966 | Merriam | 328/55 |
| 3,244,907 | 4/1966 | Daigle, Jr. | 328/55 |
| 3,329,831 | 7/1967 | Abramson et al. | 307/223 B |
| 3,684,897 | 8/1972 | Anderson et al. | 307/269 |

*Primary Examiner*—Stanley D. Miller, Jr.

*Attorney, Agent, or Firm*—Kevin R. Peterson; Paul W. Fish; Edward G. Fiorito

[57] ABSTRACT

Apparatus for precisely controlling the interval by which a conditioning signal on one conductor overlaps part of a unit enabling signal on another conductor in a dynamic storage semiconductor memory system. The apparatus provides an initial conditioning signal pulse which extends beyond the desired interval of overlap with the unit enabling timing pulse and gates the conditioning signal with a selectively delayed inverse of the unit enabling pulse. This provides a resultant conditioning or precharging timing pulse that terminates at the end of a precise interval after the leading edge of the associated unit enabling timing pulse.

5 Claims, 2 Drawing Figures

PATENTED FEB 1 1 1975 3,866,061

OVERLAP TIMING CONTROL CIRCUIT FOR CONDITIONING SIGNALS IN A SEMICONDUCTOR MEMORY

BACKGROUND OF THE INVENTION

This invention relates to the generation of different timing pulses which overlap each other by a precise interval and, more particularly, to an improved generator of different overlapping timing pulses for use in semiconductor memory systems.

The operation of semiconductor memory systems having dynamic storage cells usually requires the use of timing pulses on different conductors which overlap each other. In metal oxide semiconductor (MOS) memories of the integrated circuit type, for example, it is usually necessary to provide a conditioning or precharging pulse that overlaps a chip enabling pulse by fractions of a microsecond. It is further required that the interval of overlap of such pulses neither exceeds nor becomes shorter than a desired interval within specified limits.

Various delayed pulses from a tapped delay line are often used to set and reset various flip-flops, or pulses from alternate taps on a delay line may be inverted and gated with uninverted pulses from adjacent taps to control the duration and sequence of different timing pulses as taught in Gerrard et al U.S. Pat. No. 3,336,036, issued May 28, 1968. Such techniques do not, however, provide overlapping timing pulses. It has also been a practice in the past to activate precisely controlled monostable or delay multivibrators by different timing pulses to provide overlapping pulses when required. This is a complex and costly arrangement for generating such overlapping pulses.

SUMMARY OF THE INVENTION

Accordingly, the present invention provides an improved circuit for generating overlapping timing pulses on different conductors in which the precise overlap interval can be easily controlled or preselected. This is accomplished by generating timing pulses in which initial first pulses overlap second pulses on another conductor by more than the required interval. The second timing pulses are inverted and delayed by a preselected interval and gated with the initial first timing pulses. This produces resultant first timing pulses which overlap the second timing pulses by the precise interval as required.

For a more complete understanding of the invention, reference should be made to the accompanying drawings, wherein:

FIG. 1 is a schematic block diagram of the circuit of the present invention; and FIG. 2 is a series of waveforms used in explaining the operation of the invention.

DESCRIPTION OF THE PREFERRED EMBODIMENTS

Figures 1, 2:
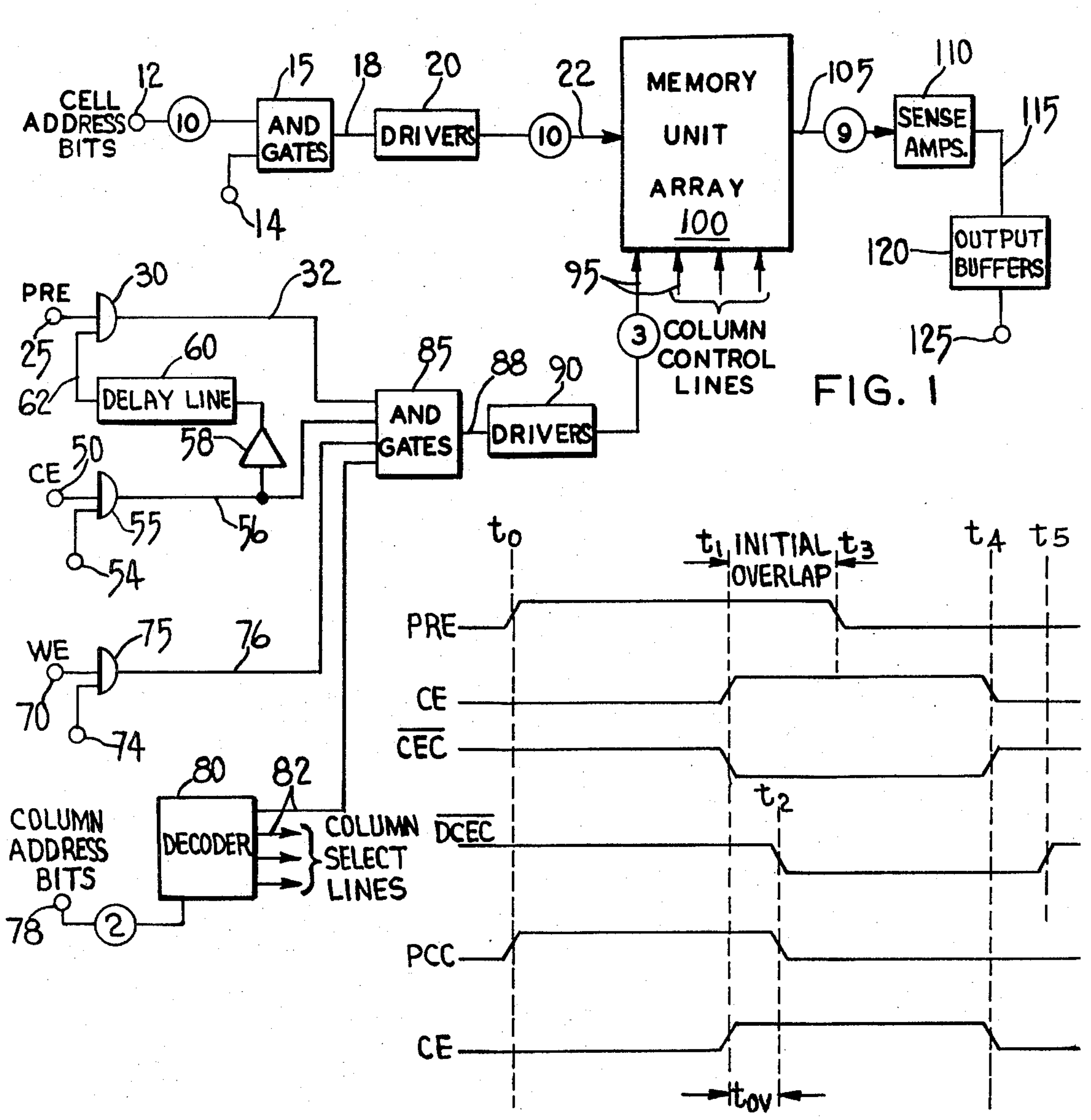

Referring to FIG. 1 in detail, the data storage portion of a semiconductor memory system is represented by a memory unit array 100. This memory array includes four columns of nine memory units or semiconductor chips such as the well known type 1024 bit MOS integrated circuit memory units which are presently widely available. The columns of the memory units are selectively controlled by column control lines 95.

Corresponding memory units of the different columns of the array are also coupled in nine rows to nine output or sense lines 105 which are connected to the input terminals of sense amplifiers 110. The output terminals of the sense amplifiers are applied via conductors 115 to output buffers 120, having output terminals 125 on which the memory output signals appear. Although a matrix array 100 of four columns of memory units or chips arranged in nine rows are illustrated in the drawing, smaller or larger arrays can be operated according to the invention.

The memory unit array 100 illustrated in the drawing can include memory units or semiconductor chips having up to 1,024 storage cells in each, since ten binary address lines 22 are provided. The memory unit array 100 also includes a decoder unit (not shown) connected between address lines 22 and the memory units so that a binary address applied on the address lines may select one of the storage cells of the memory units for a read or read/write operation. Column control lines 95 select which column of the memory units are read from or written into the cell location identified by address lines 22. Memory units or chips each having a greater number of storage cells may also be utilized in the memory unit array 100 if additional memory address lines 22 are provided.

The bits or binary signals for addressing the storage cells are applied to the ten input terminals 12 of a corresponding number of AND gates 15, the other input terminals 14 of which are connected to a bias level or a source of control signals to enable them. The output of AND gates 15 are applied to the input terminals of drivers 20 via conductors 18. The output terminals of drivers 20 are connected by address lines 22 to the decoder unit of memory array 100 for the individual memory units.

The selection and control of the memory units of memory array 100 is responsive to command signals PRE which denotes a precharge command, CE which denotes a chip enable command, and WE which denotes a write command. The precharge (PRE) signal is applied to input terminals 25 of AND gate 30, the chip enable (CE) signal is applied to input terminal 50 of AND gate 55 and the write command signal (WE) is applied to input terminal 70 of AND gate 75. Input terminals 54 and 74 of CE AND gate 55 and WE AND gate 75, respectively, are coupled to bias levels or sources of control signals for enabling them.

A source of command signals (not shown) is connected to input terminals 25, 50 and 70 and provides the approximate pulse durations and timing required to operate memory array 100 as indicated in FIG. 2. The initial overlap of the precharge (PRE) and the chip enable (CE) pulses, however, exceeds the overlap interval critically specified for some dynamic storage MOS memory units. The precharge signal (PRE) is a waveform rising at time $t_0$ and falling at time $t_3$, while the chip enable signal (CE) rises at time $t_1$ and falls at time $t_4$. The initial overlap between the PRE and CE signals is thus from time $t_1$ to time $t_3$, which exceeds the specified requirement of the storage units of memory array 100. It is sometimes inconvenient to generate the command signals with the exact timing relationship that is required and may not be feasible to control the timing at their source if circuit paths of different lengths appear between the source and the memory units themselves.

In the system illustrated in FIG. 1, a chip enable signal (CEC) appears on output conductor 56 of CE AND gate 55 and is applied to the input of inverter 58. The output of inverter 58 is the $\overline{CEC}$ waveform shown in FIG. 2 which has a leading edge at time $t_1$ and a trailing edge at time $t_4$. This inverse ($\overline{CEC}$) of the chip enable (CE) signal is applied to the input of a conventional delay line 60 of any well known type. The delayed signal from delay line 60 appears on conductor 62 and is illustrated in FIG. 2 as waveform $\overline{DCEC}$ which has a leading edge at time $t_2$ and a trailing edge at time $t_5$. The delay introduced by delay line 60 is the interval between the leading edge of the $\overline{DCEC}$ waveform at time $t_2$. This delay interval established by delay line 60 is selected to conform to the critical overlap interval $t_{ov}$ specified for the memory units. This delay interval can be readily changed or adjusted if required for the memory units utilized in memory array 100.

The delayed chip enable signal ($\overline{DCEC}$) on output conductors 62 of delay line 60 is applied to an input of AND gate 30 to be gated with the precharge (PRE) signal applied to input terminal 25 of AND gate 30. The AND function of the precharge (PRE) and the delayed and inverted chip enable ($\overline{DCEC}$) signals appears on output conductor 32 of AND gate 30 and is designated waveform PCC in FIG. 2 of the drawing. As shown, the resultant precharge (PCC) signal is a waveform having a leading edge at time $t_0$ and a trailing edge at time $t_2$ and overlaps the first part of the chip enable signal that is reproduced below it from time $t_1$ to time $t_2$, which is designated as the resultant overlap $t_{ov}$.

Also generated by the source of command signals is a write command (WE) signal which is applied to input terminal 70 of AND gate 75. The gated write signal (WEC) appears on output terminal 76 of AND gate 75. The resultant PCC, CEC and WEC signals on conductors 32, 56 and 76, respectively, are applied to input terminals of three different AND gates 85, the other input terminals of which are connected to a column select line 82 of decoder 80. The inputs to decoder 80 appear on two column address bit lines 78 which indicate the column of memory units that is to be selectively controlled by the resultant command signals that are conducted to AND gates 85.

The outputs of AND gates 85 are connected by conductors 88 to the input terminals of drivers 90. The output terminals 95 of drivers 90 are connected to the memory units in the corresponding column of memory unit array 100. In the complete system, three additional sets of AND gates 85 and drivers are connected at their input terminals to command signal lines 32, 56 and 76 and the unconnected column select lines 82 and at their outputs to the unconnected column control lines 95 of memory unit array 100.

While a particular embodiment of the invention has been shown, it will be understood, of course, that it is not desired that the invention be limited thereto since modifications may be made, and it is, therefore, contemplated by the appended claims to cover any such modifications as fall within the true spirit and scope of the invention.

What is claimed is:

1. A timing circuit for precisely controlling the time during which first pulses overlap second pulses on a different conductor comprising:

first gating means for controlling a series of first pulses on a first conductor;

second gating means for controlling a series of second pulses on a second conductor, each of the second pulses overlapping the first pulses;

inverting means coupled to said second gating means for providing the inverse of the second pulses;

delay means coupled to said inverting means for delaying the inverse of the second pulses for a predetermined interval; and connecting means for delivering the delayed inverse of the second pulses to said first gating means thereby controlling the conduction of said first gating means and providing resultant pulses which overlap the second pulses for a predetermined time.

2. A timing circuit as defined in claim 1 wherein the means for providing the inverse of the second pulses comprises an inverter.

3. A timing circuit as defined in claim 1 wherein the means for delaying the inverse of the second pulses comprises a delay line.

4. A timing circuit as defined in claim 2 wherein the means for delaying the inverse of the second pulses comprises a delay line coupled between the output of said inverting means and an input of said first gating means.

5. A circuit for precisely controlling the time first and second signals provided by a pulse source are in overlapping relationship comprising:

first gating means for controlling the first pulse signals;

second gating means for controlling the second pulse signals;

inverting means coupled to said second gating means for generating the inverse of the second pulse signals;

delay means coupled between said inverting means and an input of said first gating means to provide a predetermined time delay in transmitting the inverse of the second pulse signals to said first gating means thereby controlling the time of conduction of said first gating means and the time during which the first and second pulses are in overlapping relationship.

* * * * *